United States Patent
Beattie, Jr. et al.

(10) Patent No.: US 11,323,343 B2
(45) Date of Patent: *May 3, 2022

(54) SYSTEMS AND METHODS FOR ANALYZING PERFORMANCE SILENCE PACKETS

(71) Applicant: AT&T INTELLECTUAL PROPERTY I, L.P., Atlanta, GA (US)

(72) Inventors: James Gordon Beattie, Jr., Bergenfield, NJ (US); Haywood S. Peitzer, Randolph, NJ (US); Jeffrey A. Krinsky, Woodinville, WA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/013,775

(22) Filed: Sep. 7, 2020

(65) Prior Publication Data

US 2020/0403892 A1    Dec. 24, 2020

Related U.S. Application Data

(63) Continuation of application No. 16/220,826, filed on Dec. 14, 2018, now Pat. No. 10,805,191.

(51) Int. Cl.
| | |
|---|---|
| *H04L 12/26* | (2006.01) |
| *H04B 17/318* | (2015.01) |
| *H04L 1/00* | (2006.01) |
| *H04L 29/06* | (2006.01) |
| *H04L 43/08* | (2022.01) |
| *H04L 43/04* | (2022.01) |
| *H04L 65/80* | (2022.01) |

(52) U.S. Cl.
CPC ........... *H04L 43/08* (2013.01); *H04B 17/318* (2015.01); *H04L 1/0003* (2013.01); *H04L 43/04* (2013.01); *H04L 65/80* (2013.01)

(58) Field of Classification Search
None
See application file for complete search history.

(56) References Cited

U.S. PATENT DOCUMENTS

| | | |
|---|---|---|
| 8,289,845 B1 | 10/2012 | Baldonado |
| 8,346,239 B2 | 1/2013 | Wang et al. |

(Continued)

FOREIGN PATENT DOCUMENTS

| | | |
|---|---|---|
| EP | 1432174 A2 | 6/2004 |
| WO | 2013017018 A1 | 2/2013 |

*Primary Examiner* — Scott B Christensen
(74) *Attorney, Agent, or Firm* — Guntin & Gust, PLC; Matthew Tropper

(57) ABSTRACT

In one embodiment, a method includes identifying, by a packet analyzer, one or more silence packets within a network and initiating, by the packet analyzer, a replacement of the one or more silence packets with one or more performance silence packets. The one or more performance silence packets are transmitted between a first node of the network and a second node of the network during a silence period. The method further includes receiving, by the packet analyzer, information associated with the one or more performance silence packets; and analyzing, by the packet analyzer, a connection between the first node of the network and the second node of the network using the information associated with the one or more performance silence packets.

20 Claims, 4 Drawing Sheets

(56) References Cited

U.S. PATENT DOCUMENTS

| | | |
|---|---|---|
| 9,047,877 B2 | 6/2015 | Dai et al. |
| 9,065,885 B2 | 6/2015 | Monk |
| 9,583,114 B2 | 2/2017 | Lombard et al. |
| 10,516,588 B2 | 12/2019 | Li |
| 10,523,554 B2 | 12/2019 | Bugenhagen |
| 2004/0081176 A1* | 4/2004 | Elwell .................. H04L 65/104 370/401 |
| 2005/0201414 A1 | 9/2005 | Awais |
| 2005/0261895 A1 | 11/2005 | Bauer et al. |
| 2006/0149536 A1 | 7/2006 | Li |
| 2007/0064616 A1 | 3/2007 | Miranda |
| 2008/0212567 A1 | 9/2008 | El-Hennawey et al. |
| 2010/0135171 A1 | 6/2010 | Jung |
| 2012/0102131 A1 | 4/2012 | Lin |
| 2012/0170761 A1 | 7/2012 | Ozawa |
| 2016/0005409 A1 | 1/2016 | Bruhn et al. |
| 2016/0248908 A1 | 8/2016 | Kanamarlapudi et al. |
| 2016/0293170 A1 | 10/2016 | Toftgard |
| 2016/0295579 A1 | 10/2016 | Pham et al. |
| 2017/0207988 A1 | 7/2017 | Li |
| 2017/0353598 A1 | 12/2017 | Cho et al. |

* cited by examiner

SYSTEMS AND METHODS FOR ANALYZING PERFORMANCE SILENCE PACKETS

RELATED APPLICATION

This application is a continuation under 35 U.S.C. § 120 of U.S. application Ser. No. 16/220,826 filed on Dec. 14, 2018 and entitled "SYSTEMS AND METHODS FOR ANALYZING PERFORMANCE SILENCE PACKETS," incorporated herein by reference.

TECHNICAL FIELD

This disclosure generally relates to silence packets, and more specifically to systems and methods for analyzing performance silence packets.

BACKGROUND

The quality of a voice connection established via a communications network may degrade or improve depending on one or more factors. For example, a user of a device may degrade or improve an established voice connection by changing a location of the device within the network, which may affect the device's network coverage. Interfering with the flow of the user's voice traffic in a changing environment could potentially impair or terminate a marginal voice connection.

SUMMARY

According to an embodiment, a method includes identifying, by a packet analyzer, one or more silence packets within a network and initiating, by the packet analyzer, a replacement of the one or more silence packets with one or more performance silence packets. The one or more performance silence packets are transmitted between a first node of the network and a second node of the network during a silence period. The method further includes receiving, by the packet analyzer, information associated with the one or more performance silence packets and analyzing, by the packet analyzer, a connection between the first node of the network and the second node of the network using the information associated with the one or more performance silence packets.

According to another embodiment, a system includes one or more processors and a memory storing instructions that, when executed by the one or more processors, cause the one or more processors to perform operations including identifying, by a packet analyzer, one or more silence packets within a network and initiating, by the packet analyzer, a replacement of the one or more silence packets with one or more performance silence packets. The one or more performance silence packets are transmitted between a first node of the network and a second node of the network during a silence period. The operations further include receiving, by the packet analyzer, information associated with the one or more performance silence packets and analyzing, by the packet analyzer, a connection between the first node of the network and the second node of the network using the information associated with the one or more performance silence packets.

According to yet another embodiment, one or more computer-readable storage media embody instructions that, when executed by a processor, cause the processor to perform operations including identifying, by a packet analyzer, one or more silence packets within a network and initiating, by the packet analyzer, a replacement of the one or more silence packets with one or more performance silence packets. The one or more performance silence packets are transmitted between a first node of the network and a second node of the network during a silence period. The operations further include receiving, by the packet analyzer, information associated with the one or more performance silence packets and analyzing, by the packet analyzer, a connection between the first node of the network and the second node of the network using the information associated with the one or more performance silence packets.

This disclosure may provide one or more of the following technical advantages. The quality of a voice connection may be improved by evaluating and diagnosing the quality of the voice connection without interfering with the flow of user voice traffic. For example, one or more diagnostic actions may be initiated during periods of silence, which may improve the quality of the user experience. Measuring and diagnosing digital voice connections may be applied to digital systems that are not cellular, which may be beneficial in a stand-alone mode as well as when interworking with other networks (e.g., a first responder network dedicated to public safety). The process of collecting information from performance silence packets and/or diagnostic silence packets can be scaled to prevent data overload with the collection of non-meaningful data on connections that are inherently stable. The quality of the voice connection can be analyzed using the methods and systems described herein in its current and evolved states. Diagnostic silence packets may be exchanged within the network to determine optimal settings (e.g., quality, latency, traffic load, and the like) required for optimal service. In digital systems (e.g., push-to-talk (PTT) operating modes), additional packets may be appended to convey performance measurements, diagnostic tests, and/or codec mode changes.

The systems and methods described herein may be applied to cellular, land, mobile, radio, and Voice over Internet Protocol (VoIP) systems that may have variable locations, servers, and traffic loads when network elements are provided in a cloud as virtual network services. The systems and methods described herein may be applied to VoIP systems regardless of whether wireless elements are involved, as the connections may suffer from traffic and/or server topology if cloud elements are used to support the connections.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DETAILED DESCRIPTION

Communication networks do not collect quality metrics on a systematic basis for conditions that are created by either the network or an end user. Different forms of communication require different qualitative metrics to be optimized. Quality, latency, and traffic load are each examples of metrics priorities that may vary by application and community. This disclosure discusses the collection and measurement of voice connections throughout a network using periods of silence. Silence packets, which are transmitted during periods of silence, are replaced with performance silence packets that collect information associated with a network voice connection and/or diagnostic silence packets that initiate corrective measures to improve the quality of the network voice connection.

Figure 1:
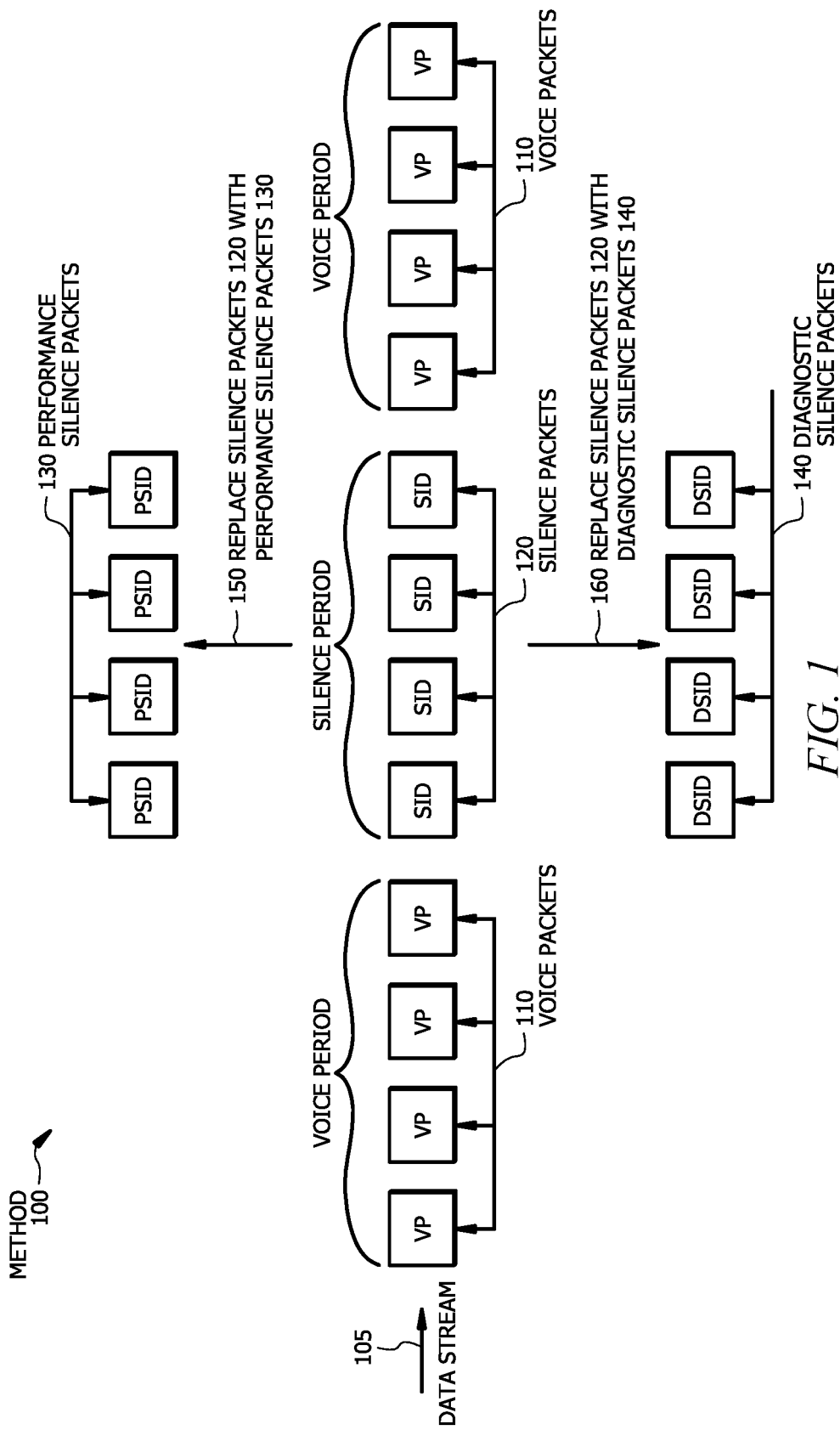
FIG. 1 illustrates an example method for replacing silence packets in a network.
Figure 2:
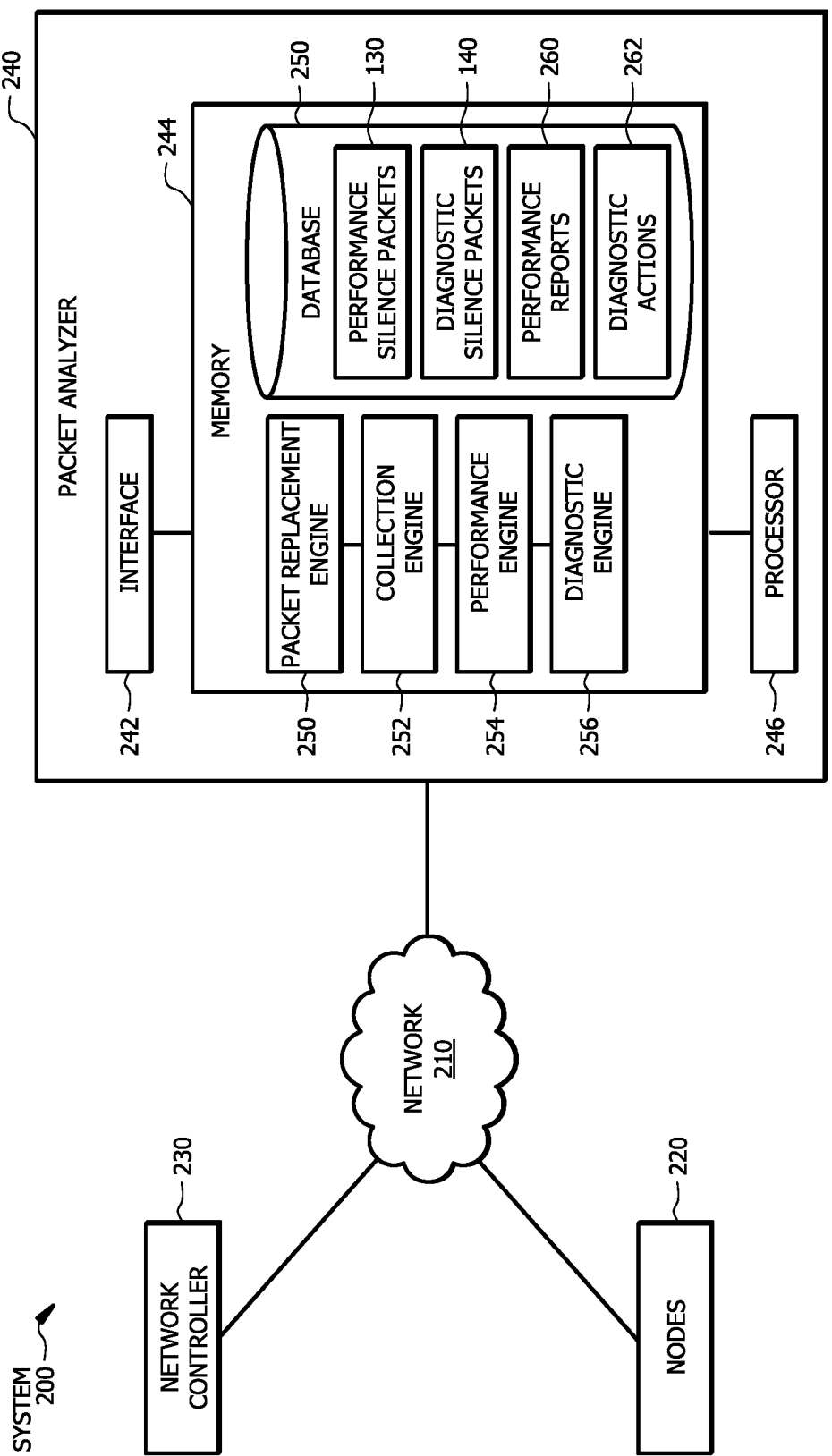
FIG. 2 illustrates an example system for analyzing performance silence packets.
Figure 3:
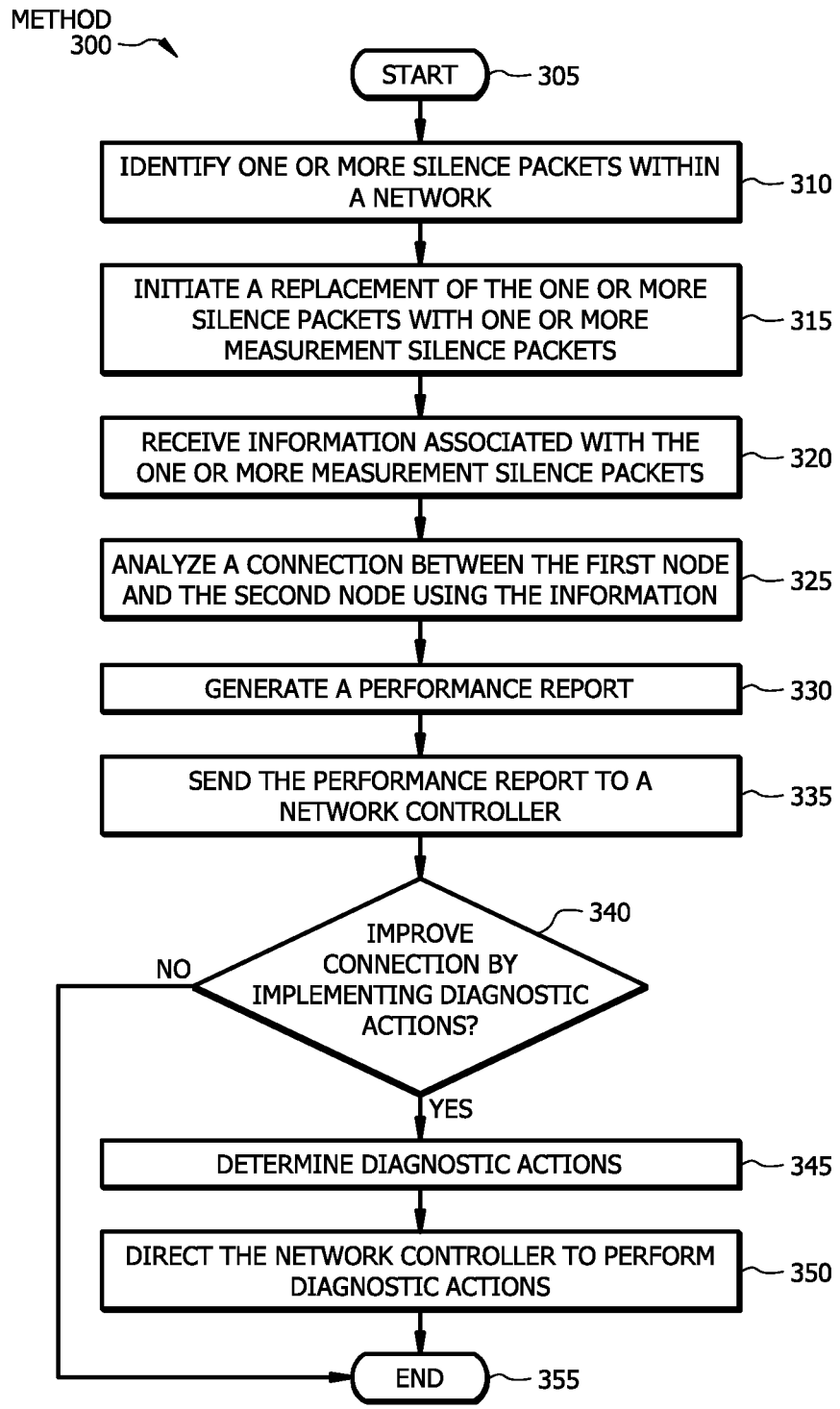
FIG. 3 illustrates an example method for analyzing performance silence packets.
Figure 4:
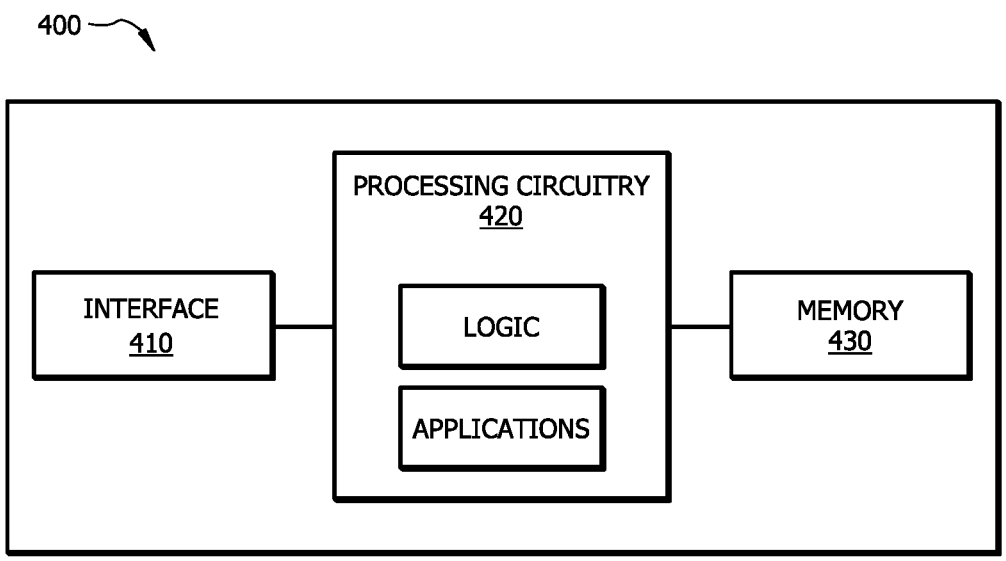
FIG. 4 illustrates an example computer system that may be used by the systems and methods described herein.

FIGS. 1 through 4 show example systems and methods for analyzing performance silence packets. FIG. 1 shows an example method for replacing silence packets in a network. FIG. 2 shows an example system for analyzing performance silence packets and FIG. 3 shows an example method for analyzing performance silence packets. FIG. 4 shows an example computer system that may be used by the systems and methods described herein.

FIG. 1 illustrates an example method 100 for replacing silence packets 120 in a network. Method 100 of FIG. 1 includes a data stream 105 that includes voice packets 110 and silence packets 120. Data stream 105 is associated with any suitable communication session that includes at least some audio (e.g., a voice telephone call, a VoIP call, a cellular call, and the like). Voice packets 110 are packets sent through a network during voice periods. Voice packets 110 are used to transmit voice over a network. For example, a voice signal may be digitalized, compressed, and/or converted to internet protocol (IP) voice packets 110 and transmitted over the network. Silence packets 120 are packets sent through the network during silence periods. Silence packets 120 may be keepalive packets that are used to maintain a connection between two network nodes. Silence packets 120 may also be silence insertion descriptor (SID) packets generated at the onset of a silence period.

One or more silence packets 120 transmitted during silence periods may be replaced (see notation 150) with one or more performance silence packets 130. Performance silence packets 130 include protocols for collecting information associated with a network connection. Performance silence packets 130 may collect information associated with a quality of the connection, a latency of the connection, and/or a traffic load of the connection. Performance silence packets 130 are discussed in more detail in FIG. 2 below.

One or more silence packets 120 transmitted during silence periods may be replaced (see notation 160) with one or more diagnostic silence packets 140. Diagnostic silence packets 140 include protocols for transmitting information associated with a network connection. Diagnostic silence packets 140 may transmit information that instructs one or more components of the network to change a codec associated with the connection, adjust a modulation and coding scheme associated with the connection, and/or change a bandwidth associated with the connection. Diagnostic silence packets 140 are discussed in more detail in FIG. 2 below.

As such, method 100 of FIG. 1 replaces silence packets 120 that are traditionally transmitted during periods of silence in networks with one or more performance packets 130 and/or diagnostic silence packets 140 to collect, measure, diagnose, and/or improve the quality of the associated network connection without interfering with the flow of user voice traffic in the network. The steps of method 100 may be implemented using any suitable combination of hardware, firmware, and software. For example, the steps of method 100 may be implemented using one or more components described in FIG. 4.

FIG. 2 illustrates an example system 200 for analyzing performance silence packets. System 200 includes a network 210, nodes 220, a network controller 230, and a packet analyzer 240. Packet analyzer 240 includes an interface 242, a memory 244, and a processor 246. Memory 244 of packet analyzer 240 includes a packet replacement engine 250, a collection engine 252, a performance engine 254, a diagnostic engine 256, and a database 250. Database 250 includes performance silence packets 130, diagnostic silence packets 140, performance reports 260, and diagnostic actions 262.

Network 210 may be any type of network that facilitates communication between components of system 200. Network 210 may connect nodes 220, network controller 230, and packet analyzer 240 of system 200. Although this disclosure shows network 210 as being a particular kind of network, this disclosure contemplates any suitable network. One or more portions of network 210 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a 3G network, a 4G network, a 5G network, a Long Term Evolution (LTE) cellular network, a combination of two or more of these, or other suitable types of networks. Network 210 may be any communications network, such as a private network, a public network, a connection through Internet, a mobile network, a WI-FI network, a Bluetooth network, and the like. One or more components of system 200 may communicate over network 210. For example, packet analyzer 240 may communicate over network 210, including receiving information from nodes 220 and/or network controller 230 and transmitting information to nodes 220 and/or network controller 230. One or more components of network 210 may include one or more access, core, and/or edge networks.

Nodes 220 of system 200 are connection points that can receive, create, store, and/or transmit data throughout network 210. For example, a first node 220 of network 210 may transmit one or more performance silence packets 130 and/or one or more diagnostic silence packets 140 to a second node 220 of network 210. Nodes 220 may be located in a single network 210 or in multiple networks 210. Nodes 220 of system 200 may be redistribution points or communication endpoints of network 210. Each node 220 may be a computer system that includes an interface, a memory, and a processor, which may be components of computer system 400. Nodes 210 may include one or more switches, routers, collectors, gateways, and/or edge nodes. Adjacent nodes 220, also known as neighboring nodes, are nodes that are connected by a single link. Each link represents a communication path between two adjacent nodes 220 of network 210. Links between adjacent nodes 220 may be bidirectional such that a first link spans from a first node to a second node and a second link spans from the second node to the first node. For example, first node 220 may transmit one or more performance silence packets 130 and/or one or more diagnostic silence packets 140 to second node 220 of network 210, and second node 220 may transmit one or more performance silence packets 130 and/or one or more diagnostic silence packets 140 to first node 220 of network 210.

One or more nodes 220 of system 200 may be a device (e.g., an electronic device) that is capable of creating, receiving, and/or transmitting information over network 210. The device may be any physical component operable to transmit and/or receive voice traffic over network 210. The device may include one or more mobile devices, such as a smartphone, a laptop computer, a tablet computer, a camera (e.g., a video camera), and wearables. The device may also include one or more non-mobile devices, such as a television, a desktop computer, and a webcam. The device may be operated by one or more users. The user may be a person or a machine.

Network controller 230 of system 200 is a component that manages nodes 220 of network 210. Network controller 230 may manage connections between nodes 220 of network 210. Network controller 230 may analyze a state of network 210 and perform actions based on the analysis. Network controller 230 may collect information from one or more nodes 220 of network 210 periodically, continuously, or on demand. For example, network controller 230 may collect information associated with a data session (e.g., data stream 105 of FIG. 1) between two nodes 220 of network 210. Network controller 230 may validate and/or authenticate the data session.

Network controller 230 may act as a master controller to nodes 220 of system 200. As master controller, network controller 230 may control the flow of traffic between two neighboring nodes 220 of network 210. Network controller 230 may transmit information to and/or receive information from packet analyzer 240 of system 200. For example, network controller 230 may locate silence packets (e.g., silence packets 120 from FIG. 1) within network 210 and communicate the location of the silence packets to packet analyzer 240. Network controller 230 may act as a slave controller to packet analyzer 240 of system 200. For example, network controller 230 may transmit performance silence packets 130 and/or diagnostic silence packets 140 between neighboring nodes 220 of network 210 in accordance with instructions received from packet analyzer 240.

Packet analyzer 240 is an application that analyzes packets received from network 210. Packet analyzer 240 may generate one or more performance silence packets 130 and/or one or more diagnostic silence packets 140. Packet analyzer 240 may replace one or more silence packets (e.g., silence packets 120 of FIG. 1) with one or more performance silence packets 130 and/or diagnostic silence packets 140. Packet analyzer 240 may receive one or more performance silence packets 130 that have been transmitted between nodes 220 of network 210 and analyze the information obtained from the one or more performance silence packets 130. Packet analyzer 240 may generate reports in response to analyzing the information obtained from the one or more performance silence packets 130. Packet analyzer 240 may determine one or more diagnostic actions 262 and generate one or more diagnostic silence packets 140.

Packet analyzer 240 may be controlled by an entity (e.g., an individual, business, or company). The entity may be a network service provider or an Internet service provider. The entity may be a telecommunications company, a data carrier, a wireless communications provider, or a cable television operator. The entity may deliver different services (e.g., voice connections) to one or more users (e.g., customers) via network 210. The entity may operate in a cloud. The cloud may be implemented using any suitable combination of hardware, firmware, and software. For example, the cloud may be implemented using one or more components of the computer system of FIG. 4.

Packet analyzer 240 includes an interface 242, a memory 244, and a processor 246. Interface 242 of packet analyzer 240 represents any suitable computer element that can receive information from network 210, transmit information through network 210, perform suitable processing of the information, communicate to other components (e.g., nodes 220 of and network controller 230) of system 200, or any combination of the preceding. Interface 242 may receive information associated with one or more performance silence packets 130 from network 210, for example. Interface 242 may transmit information associated with one or more diagnostic silence packets 140, as another example. Interface 242 represents any port or connection, real or virtual, including any suitable combination of hardware, firmware, and software, including protocol conversion and data processing capabilities, to communicate through a LAN, a WAN, or other communication system that allows system 200 to exchange information between components of system 200.

Memory 244 of packet analyzer 240 stores, permanently and/or temporarily, received and transmitted information, as well as system software, control software, other software for packet analyzer 240, and a variety of other information. Memory 244 may store information for execution by processor 246. Memory 244 includes any one or a combination of volatile or non-volatile local or remote devices suitable for storing information. Memory 244 may include Random Access Memory (RAM), Read-only Memory (ROM), magnetic storage devices, optical storage devices, or any other suitable information storage device or a combination of these devices. Memory 244 may include any suitable information for use in the operation of packet analyzer 240. Additionally, memory 244 may be a component external to (or may be partially external to) packet analyzer 240. Memory 244 may be located at any location suitable for memory 244 to communicate with packet analyzer 240. Memory 244 may store packet replacement engine 250, collection engine 252, performance engine 254, and diagnostic engine 256.

Replacement engine 250 of packet analyzer 240 initiates the replacement of silence packets (e.g., silence packets 120 of FIG. 1) with performance silence packets 130 and/or diagnostic silence packets 140. Replacement engine 250 may identify one or more silence packets within network 210. For example, replacement engine 250 may receive an indication from network controller 230 of system 200 that one or more silence packets are to be transferred between nodes 220 of network 210. Replacement engine 250 may initiate a replacement of the silence packets with one or more performance silence packets 130. For example, replacement engine 250 may instruct network controller 230 to replace the silence packets with one or more performance silence packets 130.

Replacement engine 250 of system 200 may initiate the replacement of the silence packets with one or more performance silence packets 130 in response to one or more of the following conditions: identifying a physical change of a location of one or more nodes 220 (e.g., a user device) of network 210, anticipating the physical change of the location of one or more nodes 220 of network 210, identifying a change in a received signal strength indicator (RSSI) associated with one or more nodes 220 of network 210, identifying a loss of one or more packets (e.g., voice packets 110 and/or silence packets 120 of FIG. 1) transmitted between nodes 220 of network 210, identifying a change in latency associated with one or more nodes 220 of network 210, identifying a change in a frequency band associated with one or more nodes 220 of network 210, and/or any other suitable condition that creates a situation where a quality of the connection may degrade or improve. In certain embodiments, replacement engine 250 learns of the preceding conditions from network controller 230. Replacement engine 250 may initiate the replacement of the silence packets dynamically. Replacement engine 250 may initiate the replacement of the silence packets in accordance with a schedule (e.g., every predetermined number of voice calls.)

Collection engine 252 of packet analyzer 240 is an application that collects information associated with one or more performance silence packets 130 that have been transmitted between nodes 220 of network 210. The information obtained from performance silence packets 130 is associated with a connection (e.g., a digital voice connection) between nodes 220 (e.g., devices, edge nodes, and/or gateways) of network 210. Collection engine 252 may collect the following information from one or more performance silence packets 130: a quality of the connection, bandwidth, direction of traffic, latency, jitter, reliability, frequency band, packet loss, traffic load of one or more components (e.g., nodes 220) of network 210, a codec associated with the connection, a modulation and coding scheme (MCS) associated with the connection, and the like. Latency is the delay in transmitting a data session (e.g., data stream 105 of FIG. 1). Jitter is the variation in latency on a packet flow between two network nodes 220 of network 210. Reliability is the ability of network 210 to communicate a data session to one or more nodes 220 (e.g., devices) of network 210. Packet loss occurs when one or more packets fail to reach their destination. A codec is a program used to encode or decode a data stream (e.g., data stream 105 of FIG. 1). An MCS is a program used to determine a data rate of a wireless connection.

Performance engine 254 of packet analyzer 240 is an application that generates performance silence packets 130 and/or metrics using the information obtained from one or more performance silence packets 130. Performance engine 254 may generate performance silence packets 130 in response to one or more of the following conditions: identifying a physical change of a location of one or more nodes 220 of network 210, anticipating the physical change of the location of one or more nodes 220 of network 210, identifying a change in an RSSI associated with one or more nodes 220 of network 210, identifying a loss of one or more packets transmitted between nodes 220 of network 210, identifying a change in latency associated with one or more nodes 220 of network 210, identifying a change in a frequency band associated with one or more nodes 220 of network 210, and/or any other suitable condition that creates a situation where a quality of the connection may degrade or improve. In certain embodiments, performance engine 254 learns of the preceding conditions from network controller 230.

Performance engine 254 may generate one or more of the following metrics using the information received from one or more performance silence packets 130: the quality of the connection, bandwidth, direction of traffic, latency, jitter, reliability, frequency band, packet loss, traffic load of one or more components (e.g., nodes 220) of network 210, a codec associated with the connection, an MCS associated with the connection, and/or any other suitable information.

Performance engine 254 may generate one or more performance reports 260 based on the information obtained from one or more performance silence packets 130. Performance report 260 is a representation of the information received from performance silence packets 130. For example, performance report 260 may represent a qualitative reaction of first node 220 of network 210 to what first node 220 receives from second node 220 of network 210. Performance report 260 may include the following information: a quality metric, a bandwidth metric, a direction of traffic metric, a latency metric, a jitter metric, a reliability metric, a frequency band metric, a packet loss metric, a traffic load metric of one or more components (e.g., nodes 220) of network 210, a codec metric, an MCS metric, and/or any other suitable metric.

Performance engine 254 may communicate one or more performance reports 260 to network controller 230 during one or more silence periods. Performance engine 254 may instruct network controller 230 to communicate one or more performance reports 260 to one or more nodes 220 of network 210 during one or more silence periods. Components (e.g., nodes 220 and/or network controller 230) receiving performance reports 260 may determine to perform one or more actions during one or more silence periods to improve a voice connection based on information obtained from performance reports 260. For example, network controller 230 may resynchronize nodes 220 with a different codec based on information obtained from performance report 260. As another example, node 220 may change to a different codec based on information obtained from performance report 260.

Diagnostic engine 256 of packet analyzer 240 is an application that determines one or more diagnostic actions 262 to improve a connection (e.g., a digital voice connection) between nodes 220 of network 210. Diagnostic engine 256 may determine one or more diagnostic actions 262 based on information obtained from one or more performance silence packets 130. For example, diagnostic engine 256 may compare information obtained from performance data packets 130 to one or more optimal characteristics for the connection. The optimal characteristics may include one or more of the following: Quality of Service (QoS) requirements, minimum bandwidth requirements, maximum bandwidth requirements, directional requirements, latency requirements, jitter requirements, reliability requirements, frequency band capabilities, traffic load capacities of one or more components (e.g., nodes 220) of network 210, and the like. The optimal characteristics may vary based on the connection. For example, the optimal characteristics may vary based on the type of nodes 220 used to establish the connection. The optimal characteristics may vary in time. For example, the optimal characteristics associated with a device used to establish the connection may vary as the device changes location within network 210.

Diagnostic actions 262 may include one or more of the following actions: changing a codec associated with the connection, adjusting an MCS associated with the connection, changing a bandwidth associated with the connection, and/or any other suitable action that may improve the quality of the connection. Diagnostic engine 256 may generate one or more diagnostic silence packets 140 in response to determining one or more diagnostic actions 262. Diagnostic engine 256 may instruct a component of network 210 to perform one or more diagnostic actions 262. For example, network controller 230 of network 210 may initiate the transmittal of one or more diagnostic silence packets 140 between nodes 220 of network 210. Diagnostic silence packets 140 may include an identification of a codec, an MCS, and the like.

Memory 244 may store database 250. Database 250 may store certain types of information from network 210 for packet analyzer 240. For example, database 250 may store performance silence packets 130, diagnostic silence packets 140, performance reports 260, and diagnostic actions 262.

Database 250 may be any one or a combination of volatile or non-volatile local or remote devices suitable for storing information. Database 250 may include RAM, ROM, magnetic storage devices, optical storage devices, or any other suitable information storage device or a combination of these devices. Database 250 may be a component external to packet analyzer 240. Database 250 may be located in any location suitable to store information associated with packet analyzer 240.

Processor 246 of packet analyzer 240 controls certain operations of packet analyzer 240 by processing information received from interface 242 and memory 244 or otherwise accessed by processor 246. Processor 246 communicatively couples to interface 242 and memory 244. Processor 246 may include any hardware and/or software that operates to control and process information. Processor 246 may be a programmable logic device, a microcontroller, a microprocessor, any suitable processing device, or any suitable combination of the preceding. Additionally, processor 246 may be a component external to packet analyzer 240. Processor 246 may be located in any location suitable for processor 246 to communicate with packet analyzer 240. Processor 246 of packet analyzer 240 controls the operations of packet replacement engine 250, collection engine 252, performance engine 254, and diagnostic engine 256.

Although FIG. 2 illustrates a particular arrangement of network 210, nodes 220, network controller 230, packet analyzer 240, interface 242, memory 244, replacement engine 250, collection engine 252, performance engine 254, diagnostic engine 256, processor 246, and database 250, this disclosure contemplates any suitable arrangement of network 210, nodes 220, network controller 230, packet analyzer 240, interface 242, memory 244, replacement engine 250, collection engine 252, performance engine 254, and diagnostic engine 256, processor 246, and database 250. Network 210, nodes 220, network controller 230, packet analyzer 240, interface 242, memory 244, replacement engine 250, collection engine 252, performance engine 254, and diagnostic engine 256, processor 246, and database 250 may be physically or logically co-located with each other in whole or in part.

Although FIG. 2 illustrates a particular number of networks 210, nodes 220, network controllers 230, packet analyzers 240, interfaces 242, memories 244, replacement engines 250, collection engines 252, performance engines 254, diagnostic engines 256, processors 246, and databases 250, this disclosure contemplates any suitable number of networks 210, nodes 220, network controllers 230, packet analyzers 240, interfaces 242, memories 244, replacement engines 250, collection engines 252, performance engines 254, diagnostic engines 256, processors 246, and databases 250. For example, system 200 may include multiple network controllers 230 and/or packet analyzers 240. One or more components of system 200 may be implemented using one or more components of the computer system of FIG. 4.

In operation, packet replacement engine 250 of packet analyzer 240 of system 200 identifies one or more silence packets (e.g., silence packets 120 of FIG. 1) within network 210. The silence packets are associated with a voice connection between two or more nodes 220 of network 210. Packet replacement engine 250 initiates a replacement of one or more silence packets 120 with one or more performance silence packets 130. One or more performance silence packets 130 are transmitted between nodes 220 of network 210 during a silence period. Collection engine 252 of packet analyzer 240 collects information associated with one or more performance silence packets 130. Performance engine 254 of packet analyzer 240 generates metrics (e.g., quality, latency, and traffic load metrics) using the information collected from performance silence packets 130 by collection engine 252. Performance engine 254 generates performance report 260 that includes the metrics.

Diagnostic engine 256 uses the information collected from performance silence packets 130 by collection engine 252 to determine whether the voice connection may be improved through one or more diagnostic actions 262. If diagnostic engine 256 determines that he voice connection may be improved, diagnostic engine 256 determines one or more diagnostic actions 262 that may improve the connection. Diagnostic engine 256 generates one or more diagnostic silence packets 140 based on diagnostic actions 262. Packet replacement engine 250 identifies one or more silence packets and initiates a replacement of the one or more silence packets with one or more diagnostic silence packets 140 by instructing network controller 230 to transmit one or more diagnostic silence packets 140 within network 210 during periods of silence. As such, system 200 of FIG. 2 measures, diagnoses, and/or improves the quality of a voice connection during periods of silence without interfering with the flow of user voice traffic.

FIG. 3 shows an example method for analyzing performance silence packets. Method 300 begins at step 305. At step 310, a packet replacement engine (e.g., packet replacement engine 250 of FIG. 2) identifies one or more silence packets (e.g., silence packets 120 of FIG. 1) within a network (e.g., network 210 of FIG. 2). The silence packets are associated with a voice connection between a first node and a second node (e.g., nodes 220 of FIG. 2) of the network.

At step 315, the packet replacement engine initiates a replacement of the one or more silence packets with one or more performance silence packets (e.g., performance silence packets 130 of FIG. 2). The one or more performance packets include protocols for collecting information associated with the voice connection. The information may include a quality of the voice connection, bandwidth, direction of traffic, latency, jitter, reliability, frequency band, packet loss, traffic load of one or more components (e.g., nodes 220) of network 210, a codec associated with the voice connection, a modulation and coding scheme (MCS) associated with the connection, and the like. The one or more performance silence packets are transmitted between the nodes of the network during one or more silence periods.

At step 320, a collection engine (e.g., collection engine 252 of FIG. 2) receives information initiated by the protocol of the one or more performance silence packets. At step 325, a performance engine (e.g., performance engine 254 of FIG. 2) generates one or more metrics using the information received by the collection engine. The metrics may include a quality metric, a bandwidth metric, a direction of traffic metric, a latency metric, a jitter metric, a reliability metric, a frequency band metric, a packet loss metric, a traffic load metric of one or more components (e.g., nodes 220) of network 210, a codec metric, an MCS metric, and/or any other suitable metric.

At step 330, the performance engine generates a performance report (e.g., performance report 260 of FIG. 2) that includes the metrics associated with the voice connection. At step 335, the performance engine sends the performance report to a network controller (e.g., network controller 230 of FIG. 2). Upon receiving the performance report, the network controller may initiate one or more actions to improve the quality of the voice connection. For example, the network controller may resynchronize the first node and the second node with a different codec.

At step 340, a diagnostic engine (e.g., diagnostic engine 256 of FIG. 2) determines if the voice connection can be improved through one or more diagnostic actions (e.g., diagnostic actions 262 of FIG. 2). The diagnostic engine may determine if the voice connection can be improved by comparing the information obtained from performance data packets 130 to one or more optimal characteristics for the connection (e.g., bandwidth requirements, latency requirements, jitter requirements, reliability requirements, frequency band capabilities, traffic load capacities of one or more components (e.g., nodes 220) of network 210, and the like.)

If the diagnostic engine determines that the connection cannot be improved through one or more diagnostic actions, method 300 advances from step 340 to step 355, where method 300 ends. If the diagnostic engine determines that the connection can be improved through one or more diagnostic actions, method 300 moves from step 340 to step 345, where the diagnostic engine 256 determines one or more diagnostic actions (e.g., diagnostic actions 262 of FIG. 2) that may improve the connection. The diagnostic actions may include changing a codec associated with the connection, adjusting an MCS associated with the connection, changing a bandwidth associated with the connection, and/or any other suitable action that may improve the quality of the connection. For example, a diagnostic action may be replacing a first codec utilized by the voice connection with a second codec that may provide a more high-fidelity and/or more robust voice connection. In certain embodiments, the diagnostic engine generates one or more diagnostic silence packets (e.g., diagnostic silence packets 140 of FIG. 2). The diagnostic silence packets may contain instructions directing the one or more components of the network to perform the one or more diagnostic actions.

Method 300 then moves to step 350, where the diagnostic engine directs one or more components of the network to perform the one or more diagnostic actions. The diagnostic engine may direct a network controller to change the codec associated with the connection. The diagnostic engine may instruct the network controller to transmit one or more diagnostic silence packets via the network. For example, the diagnostic engine may instruct the network controller to replace one or more silence packets with the one or more diagnostic silence packets during periods of silence. Method 300 ends at step 355.

One or more steps of method 300 may be performed in real-time. For example, information associated with a voice connection that is received from one or more performance silence packets may be collected and evaluated in real-time during a voice call, the voice connection may be diagnosed in real-time during the voice call, and diagnostic actions may be performed in real-time during the voice call to improve the quality of the voice connection as well as the user experience.

Modifications, additions, or omissions may be made to method 300 depicted in FIG. 3. Method 300 may include more, fewer, or other steps. For example, method 300 may include dynamically replacing one or more silence packets with one or more performance silence packets and/or one or more diagnostic silence packets in response to one or more conditions (e.g., identifying a physical change of a location of one or more nodes of the network.) Steps of method 300 may be performed in parallel or in any suitable order. While discussed as specific components completing the steps of method 300, any suitable component may perform any step of method 300.

FIG. 4 shows an example computer system that may be used by the systems and methods described herein. For example, network 210, nodes 220, network controller 230, and packet analyzer 240 of FIG. 2 may include one or more interface(s) 410, processing circuitry 420, memory(ies) 430, and/or other suitable element(s). Interface 410 (e.g., interface 242 of FIG. 2) receives input, sends output, processes the input and/or output, and/or performs other suitable operation. Interface 410 may comprise hardware and/or software.

Processing circuitry 420 (e.g., processor 246 of FIG. 2) performs or manages the operations of the component. Processing circuitry 420 may include hardware and/or software. Examples of a processing circuitry include one or more computers, one or more microprocessors, one or more applications, etc. In certain embodiments, processing circuitry 420 executes logic (e.g., instructions) to perform actions (e.g., operations), such as generating output from input. The logic executed by processing circuitry 420 may be encoded in one or more tangible, non-transitory computer readable media (such as memory 430). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 430 (or memory unit) stores information. Memory 430 (e.g., memory 244 of FIG. 2) may comprise one or more non-transitory, tangible, computer-readable, and/or computer-executable storage media. Examples of memory 430 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
   determining, by a packet analyzer, a diagnostic action for improving a connection between a first node of a network and a second node of the network, wherein the packet analyzer is different from the first node and the second node, and wherein the connection is a voice connection comprising voice packets and silence packets generated at an onset of a silence period during the voice connection;
   generating, by the packet analyzer, a diagnostic silence packet in response to determining the diagnostic action;
   receiving and identifying, by the packet analyzer, a silence packet from the network, the silence packet being associated with the connection; and
   initiating, by the packet analyzer, a replacement of the silence packet with the diagnostic silence packet,
      wherein the diagnostic silence packet is transmitted between the first node of the network and the second node of the network during the silence period, and
      wherein the diagnostic silence packet directs a component of the network to perform the diagnostic action, the diagnostic action comprising changing a bandwidth associated with the connection without changing a codec associated with the connection.

2. The method of claim 1, wherein the diagnostic silence packet is transmitted during a cellular call.

3. The method of claim 1, wherein the diagnostic action further comprises:
   adjusting a modulation and coding scheme (MCS) associated with the connection.

4. The method of claim 1, wherein each of the first node of the network and the second node of the network is a selected one of:
   a user device;
   a gateway; and
   an edge node.

5. The method of claim 1, further comprising determining, by the packet analyzer, the diagnostic action based on information obtained by at least one performance silence packet.

6. The method of claim 1, wherein:
   the diagnostic action improves the voice connection.

7. The method of claim 1, wherein the silence packet is a Silence Insertion Descriptor (SID) packet.

8. A packet analyzer comprising one or more processors and a memory storing instructions that, when executed by the one or more processors, cause the one or more processors to perform operations, the operations comprising:
   determining a diagnostic action for improving a connection between a first node of a network and a second node of the network, wherein the packet analyzer is different from the first node and the second node, and wherein the connection is a voice connection comprising voice packets and silence packets generated at an onset of a silence period during the voice connection;
   generating, in response to determining the diagnostic action, a diagnostic silence packet;
   receiving and identifying a silence packet from the network, the silence packet being associated with the connection; and
   initiating a replacement of the silence packet with the diagnostic silence packet,
      wherein the diagnostic silence packet is transmitted between the first node of the network and the second node of the network during the silence period, and
      wherein the diagnostic silence packet directs a component of the network to perform the diagnostic action, the diagnostic action comprising changing a bandwidth associated with the connection without changing a codec associated with the connection.

9. The packet analyzer of claim 8, wherein the diagnostic silence packet is transmitted during a cellular call.

10. The packet analyzer of claim 8, wherein the diagnostic action further comprises:
    adjusting a modulation and coding scheme (MCS) associated with the connection.

11. The packet analyzer of claim 8, wherein each of the first node of the network and the second node of the network is a selected one of:
    a user device;
    a gateway; and
    an edge node.

12. The packet analyzer of claim 8, wherein the operations further comprise determining the diagnostic action based on information obtained by at least one performance silence packet.

13. The packet analyzer of claim 8, wherein:
    the diagnostic action improves the voice connection.

14. The packet analyzer of claim 8, wherein the silence packet is a Silence Insertion Descriptor (SID) packet.

15. One or more computer-readable non-transitory storage media embodying instructions that, when executed by a processor, cause the processor to perform operations, the operations comprising:
    determining, by a packet analyzer, a diagnostic action for improving a connection between a first node of a network and a second node of the network, wherein the packet analyzer is different from the first node and the second node, and wherein the connection is a voice connection comprising voice packets and silence packets generated at an onset of a silence period during the voice connection;
    generating, by the packet analyzer, a diagnostic silence packet in response to determining the diagnostic action;
    receiving and identifying, by the packet analyzer, a silence packet from the network, the silence packet being associated with the connection; and
    initiating, by the packet analyzer, a replacement of the silence packet with the diagnostic silence packet,
       wherein the diagnostic silence packet is transmitted between the first node of the network and the second node of the network during the silence period, and wherein the diagnostic silence packet directs a component of the network to perform the diagnostic action, the connection comprising a wireless connection and the diagnostic action comprising adjusting a modulation and coding scheme (MCS) associated with the wireless connection.

16. The one or more computer-readable non-transitory storage media of claim 15, wherein the diagnostic silence packet is transmitted during a cellular call.

17. The one or more computer-readable non-transitory storage media of claim 15, wherein the diagnostic action further comprises at least one of the following:
   changing a codec associated with the connection; and
   changing a bandwidth associated with the connection.

18. The one or more computer-readable non-transitory storage media of claim 15, wherein each of the first node of the network and the second node of the network is a selected one of:
   a user device;
   a gateway; and
   an edge node.

19. The one or more computer-readable non-transitory storage media of claim 15, wherein the operations further comprise determining, by the packet analyzer, the diagnostic action based on information obtained by at least one performance silence packet.

20. The one or more computer-readable non-transitory storage media of claim 15, wherein:
   the diagnostic action improves the voice connection.

* * * * *